June 20, 1950 F. J. TILLMAN Re. 23,244

TYPEWRITER CALCULATING MACHINE

Original Filed Dec. 4, 1941 4 Sheets-Sheet 1

TYPEWRITER CALCULATING MACHINE

Original Filed Dec. 4, 1941 4 Sheets-Sheet 2

Inventor:
F. J. TILLMAN,
By
George Rex Frye
Attorney

TYPEWRITER CALCULATING MACHINE
Original Filed Dec. 4, 1941 4 Sheets-Sheet 3
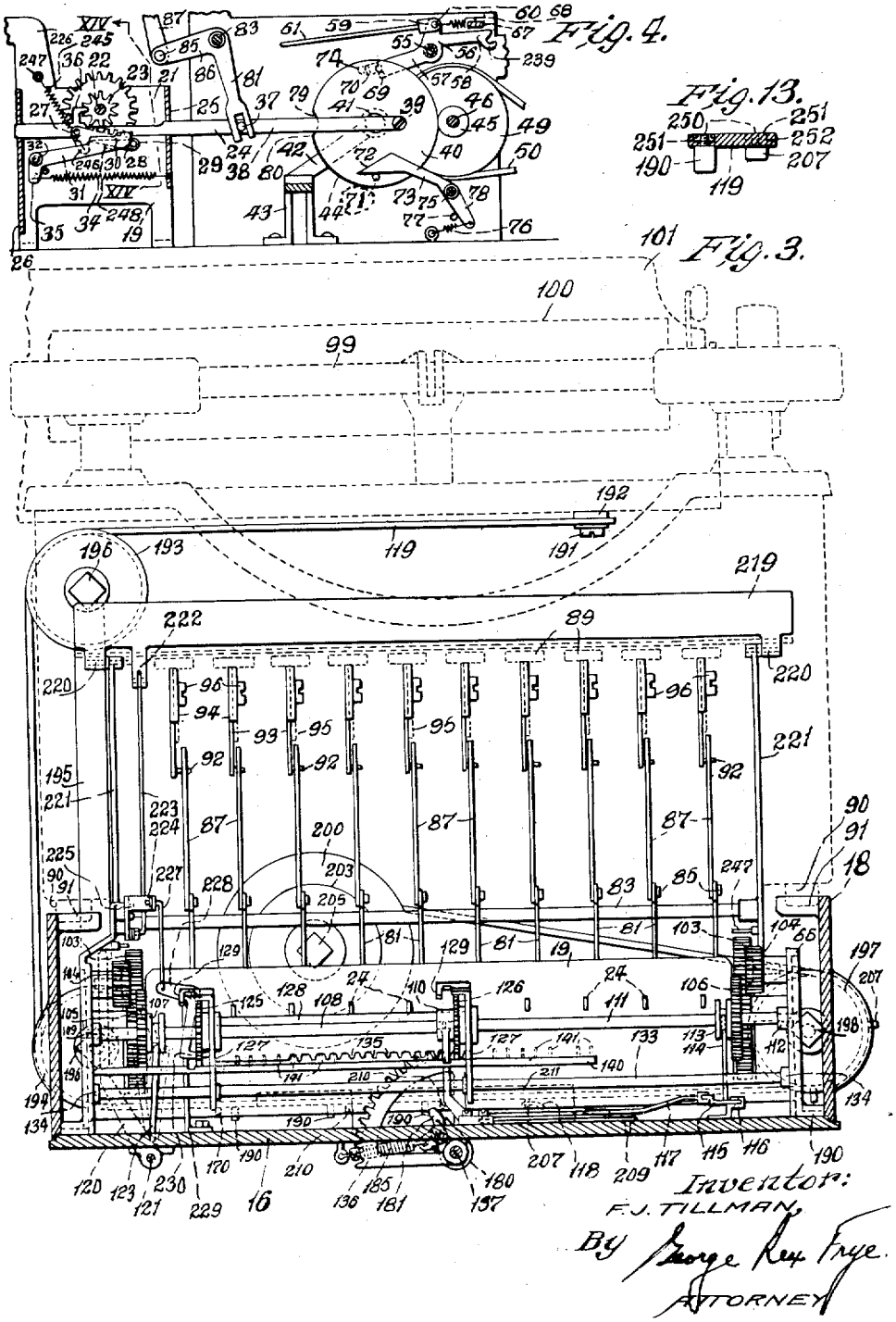

TYPEWRITER CALCULATING MACHINE
Original Filed Dec. 4, 1941 4 Sheets-Sheet 4
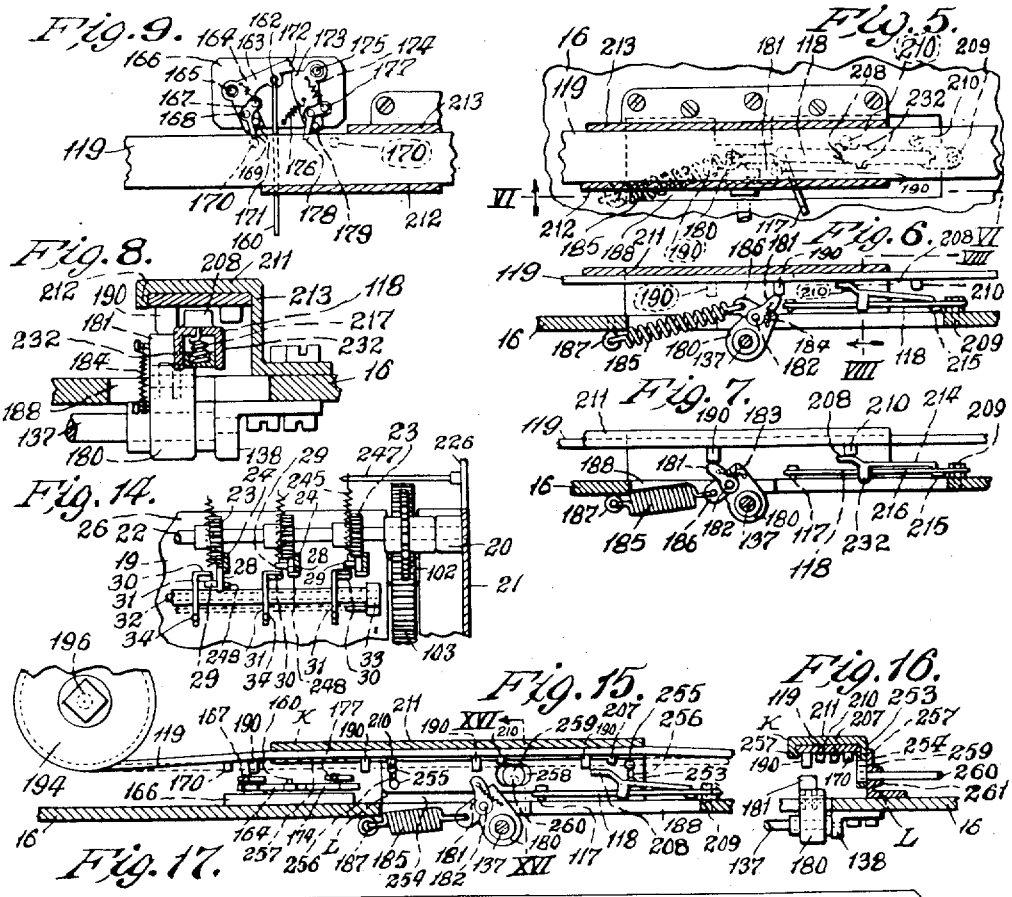
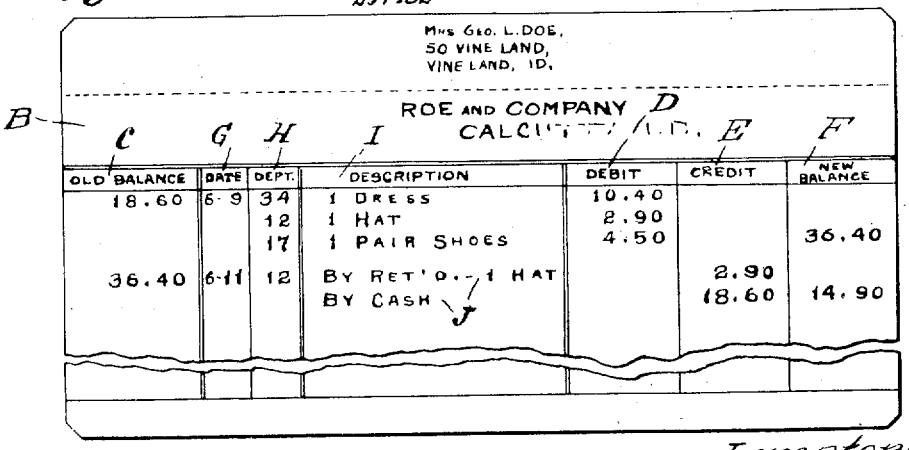
MRS GEO. L. DOE,
50 VINE LAND,
VINE LAND, ID.
ROE AND COMPANY
CALCULATING MACHINES
| OLD BALANCE | DATE | DEPT. | DESCRIPTION | DEBIT | CREDIT | NEW BALANCE |
|---|---|---|---|---|---|---|
| 18.60 | 6-9 | 34 | 1 DRESS | 10.40 | | |
| | | 12 | 1 HAT | 2.90 | | |
| | | 17 | 1 PAIR SHOES | 4.50 | | 36.40 |
| 36.40 | 6-11 | 12 | BY RET'D. 1 HAT | | 2.90 | |
| | | | BY CASH | | 18.60 | 14.90 |
Inventor:
F. J. TILLMAN,
By George Rex Fryer
Attorney Reissued June 20, 1950

Re. 23,244

UNITED STATES PATENT OFFICE 23,244

TYPEWRITER CALCULATING MACHINE

Ferdinand J. Tillman, St. Louis, Mo.

Original No. 2,487,954, dated November 15, 1949, Serial No. 557,473, October 6, 1944, which is a division of Serial No. 421,640, December 4, 1941, now Patent No. 2,359,809, dated October 10, 1944. Application for reissue March 20, 1950, Serial No. 150,572

13 Claims. (Cl. 235—59)

Matter enclosed in heavy brackets [ ] appears in the original patent but forms no part of this reissue specification; matter printed in italics indicates the additions made by reissue

This invention relates to certain new and useful improvements in calculating attachments for typewriter and is a division of my co-pending application Serial No. 421,640 filed December 4, 1941, now Patent No. 2,359,809, October 10, 1944 wherein the attachments comprise a combination of relatable and cooperable elements which are mounted and retained in a base structure on which a standard typewriter may be mounted or disposed, and there being upwardly extending attaching elements adapted for cooperation with the numeral keys and/or type bars of the typewriter whereby the calculating results of the calculating attachment may be imprinted or transcribed by the type bars of the typewriter.

An object of the invention is in utilizing the typewriter carriage moving tape for causing certain operating parts of the calculating attachments, to be moved into cooperating positions with other parts of the attachments.

Another object of the invention is in providing the calculating attachment with calculating keys that are independent of the numeral keys of the typewriter, and the provision of means whereby to protect and guard against the operation of the typewriter numeral keys during calculation being carried on by the attachment and/or the calculating keys of the attachment.

Still another object of the invention is in providing the calculating attachment with a pair of independently and separately operable accumulators whereby one of the accumulators may be utilized for adding while the other accumulator may be utilized for subtracting.

A still further object of the invention is in providing the calculating attachment with a plurality of master wheels and respective relatable accumulators with means whereby one of the accumulators can be held from operating engagement with a respective master wheel.

It is also an object of the invention to provide a calculating attachment of an improved assembly of cooperating devices which are motor driven after release of tripping mechanisms by actuation of respective accounting keys.

Still another object of the invention is in providing an improved locking mechanism which is made cooperable with the key tripping mechanisms for preventing effective actuation of a calculating key, when the electric switch for current control of the motor is operated to break the motor current circuit.

A further object of the invention is in providing an improved arrangement of a pair of accumulators which can be disposed in such cooperable relation with the transmitting calculating mechanisms for acquiring totals of both debits and credits in respect to a day's billing, wherein one accumulator will totalize debits and the other, the credits.

A still further object is in providing an improved combination of mechanisms which are made cooperable with the typewriter whereby full and complete auditing and billing of accounts showing a correct summation of both debits and credits, can be accomplished and entered on individual billing sheets on a single introduction or insertion of respective sheets, in the typewriter carriage.

Other objects and advantages will appear as this description progresses and by reference to the accompanying drawings, in which:

Figure 3 is a vertical transverse sectional view taken approximately on the line III—III of Fig. 1.

Figure 4 is a side elevation partly in section, of certain of the mechanisms shown in Fig. 1, showing them in shifted positions and pertaining to the reciprocable rack bars for operating the counting gears of the transmission accounting shaft.

Figure 5 is a fragmentary plan view partly in section, of a portion of the typewriter carriage moving tape showing certain positions of operating studs which are carried by the tape, and relatable mechanisms with which the studs are cooperable for actuating certain mechanisms of this improved calculating attachment.

Figure 6 is a vertical section taken approximately on the line VI—VI of Fig. 5.

Figure 7 is a view similar to Fig. 6, illustrating the operating parts in different positions than that in which they are shown in Fig. 6.

Figure 8 is an enlarged vertical transverse section taken approximately on the line VIII—VIII of Fig. 6.

Figure 9 is a fragmentary plan view partly in section, showing the shifted positions of the operating mechanisms for holding one of the accumulators in a position for cooperation with a master wheel gear of the master wheel carriage.

Figure 10 is an enlarged transverse section taken through one of the accumulators, showing its relation with a master wheel gear of the master wheel carriage, illustrating a locking means provided by the carriage and the accumulator for preventing over-riding motion being carried to inoperative accounting gears.

Figure 11 is an enlarged fragmentary plan view of Fig. 10.

Figure 12 is a vertical longitudinal sectional view taken approximately on the line XII—XII of Fig. 10.

Figure 13 is an enlarged fragmentary section showing the application and securing of an operating stud to the carriage tape.

Figure 14 is a vertical fragmentary section taken approximately on the line XIV—XIV of Fig. 4.

Figure 15 is a vertical longitudinal section taken through a modified form of seating plate for the typewriter carriage moving tape.

Figure 16 is a vertical transverse section taken approximately on the line XVI—XVI of Fig. 15.

Figure 17 illustrates a billing sheet having an intermediate part broken away, showing examples of the character of work which may be accomplished by the combining of this improved attachment with a typewriter.

Figure 1:
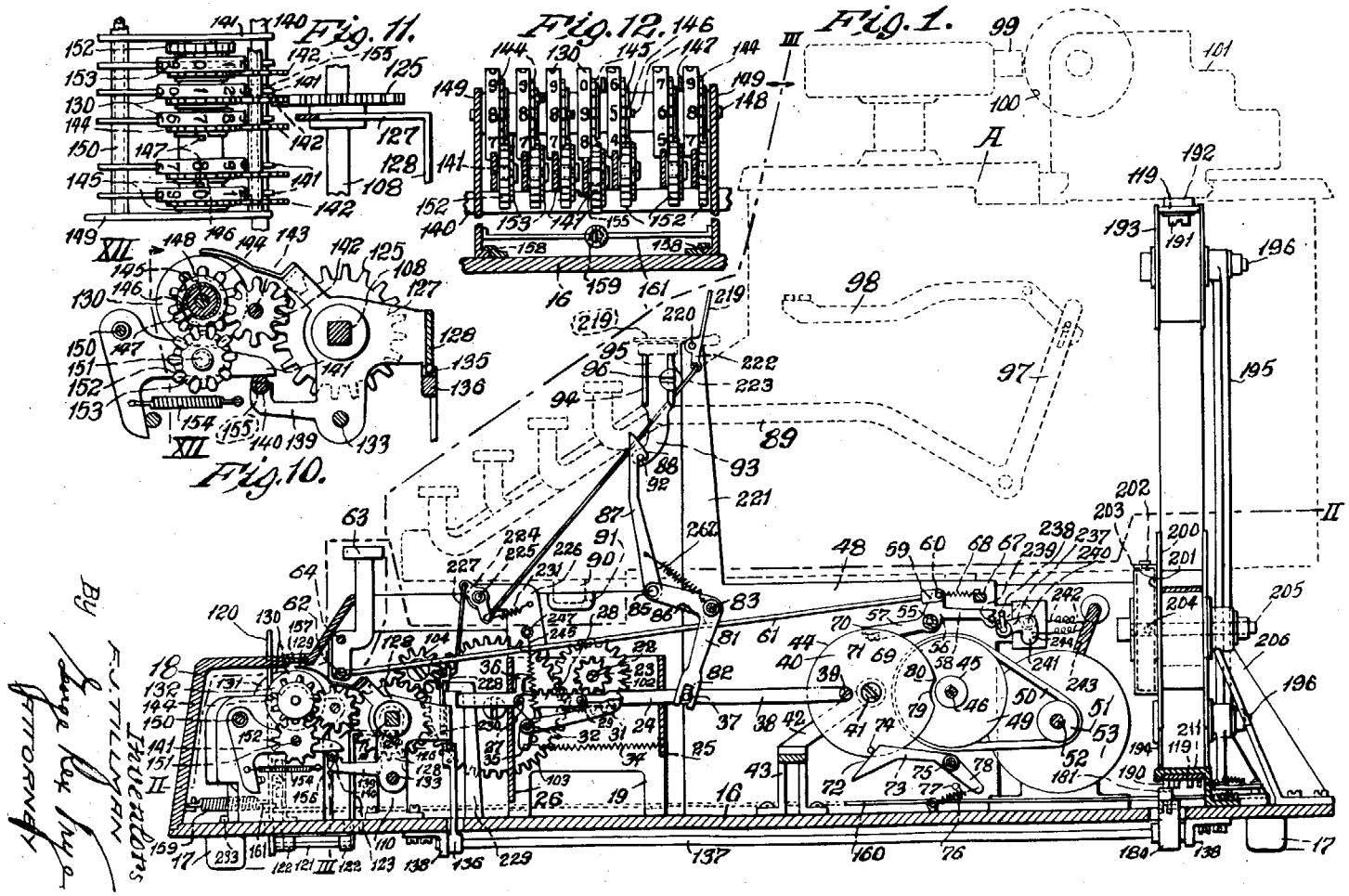
Figure 1 is a vertical longitudinal sectional view taken through this improved calculating attachment, approximately on the line I—I of Fig. 2, and the view showing in dotted lines, a surmounted typewriter thereon in attached operating relation with the calculating attachment.

Referring to the drawings by numerals signifying different parts of the structure disclosed, 16 designates a base plate which may be provided with cushion supports 17, and mounted on said base plate 16 on its front and side marginal edges, is a vertically walled housing 18.

Fixedly secured on the base plate 16 is a transversely disposed frame 19, and supported in end bearings 20, one of which is extended from respective end walls 21 of the frame 19, is a horizontally and transversely disposed transmission shaft 22, and securely fixed to said shaft in spaced relation, is a plurality of pinion gears 23.

The plurality of gears above referred to, comprises ten pinion gears, and for cooperation with each gear is a respective rack bar 24, said rack bars being disposed on a horizontal plane beneath the transmission shaft 22 and adjacent respective gears 23, said rack bars at one end being slidably supported in the side wall 25 of the frame 19 and being supported at their other ends in the side wall 26 of said frame.

Figure 2:
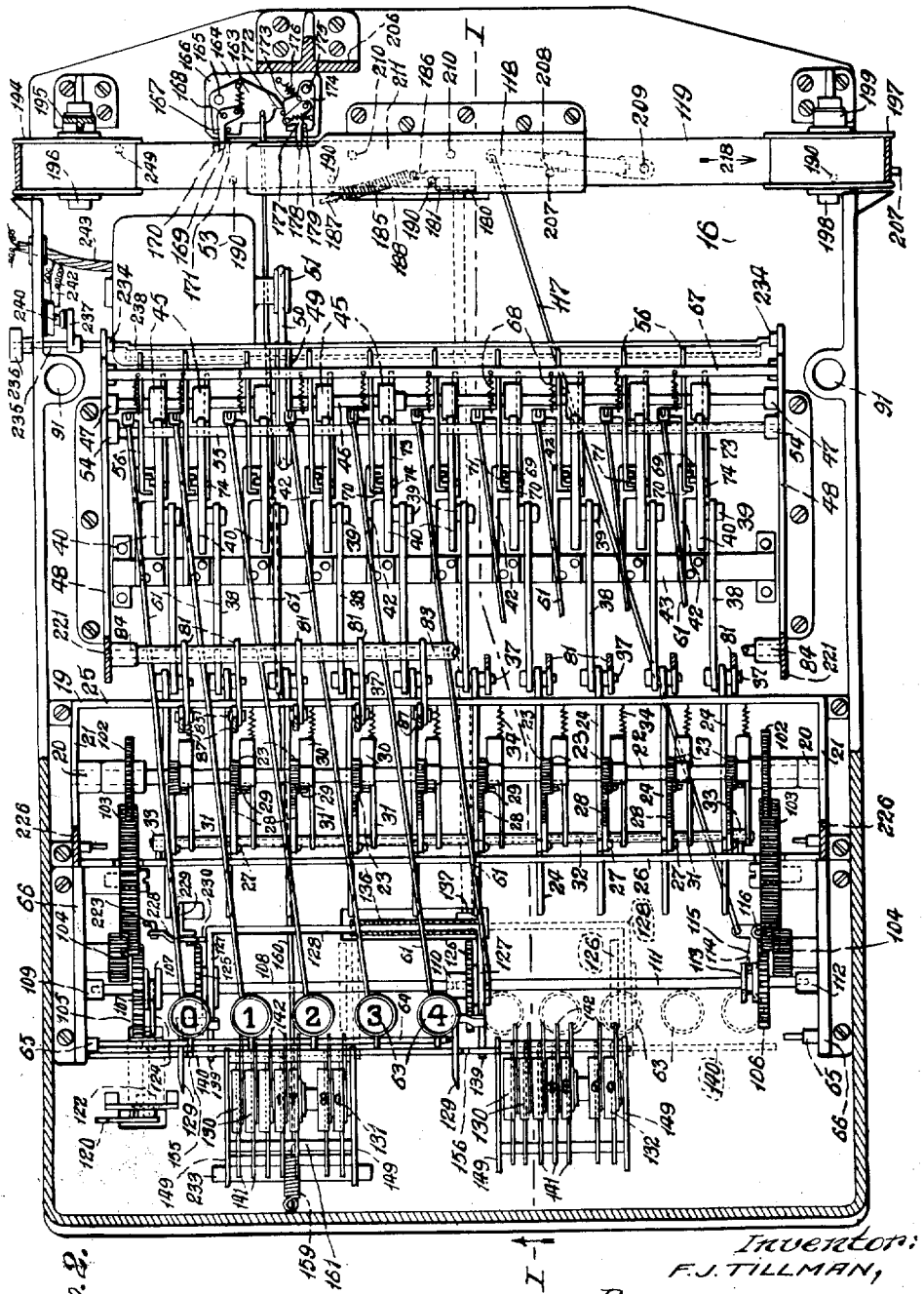
Figure 2 is a horizontal view partly in section, taken approximately on the line II—II of Fig. 1.

Pivotally secured at 27 to respective rack bars 24 is one end of a toothed rack 28, the teeth of said racks differing in number and the racks being disposed in alinement within the frame 19, and the pivots 27 thereof being located adjacent the wall 26 of the frame 19, when the toothed racks are in the positions shown in Figs. 1 and 2. Each toothed rack 28 at its opposite end is provided with a laterally extending pin 29 for both over and under engagement with a horizontal flange 30 of respective trip levers 31 during reciprocation of the rack bars 24 and respective toothed racks 28 carried thereby as the teeth of respective racks mesh with respective gears 23 of the shaft 22 for intermittently rotating said shaft different distances as the rack bars 24 are moved in one direction, during the computing and calculating operations.

The trip levers 31 of which there are ten (one relating to each toothed rack 28) are swingably mounted on a horizontally disposed rod 32 which extends lengthwise of the frame 19 and is supported in end bearings 33, each lever being actuated in one direction by a spring 34, said springs being secured at one end to an arm 35 extending from each lever and at their other ends to the side wall 25 of the frame 19. Each rack bar 24 is provided with an upstanding stop tooth 36 for cooperation with respective pinion gears 23, when respective rack bars 24 are operated in one direction.

Each of the rack bars 24 extend beyond the side wall 25 of the frame 19, and secured to each extending end of said rack bars by a respective pin 37, is one end of a connecting rod 38, the opposite end of each rod being connected at 39 to respective drive wheels 40. Each drive wheel 40 is turnably mounted on a respective fixed short shaft or screw 41, each screw being extended from a frame 43 which is secured to and is disposed transversely across the base plate 16.

For cooperation with the periphery 44 of each drive wheel 40, is a roller 45, said rollers being securely fixed to a transversely disposed shaft 46 and are made of a friction material, or the periphery of the rollers may be of friction material for dependable gripping engagement with respective peripheries 44 of the drive wheels 40. The ends of the roller shaft 46 are turnably supported in respective end bearings 47 which are each extended from a supporting end frame 48, said end frames 48 being secured to and extended upwardly from the base plate 16.

While individual rollers 45 are shown for cooperation with the peripheries of respective drive wheels 40, if desired, a single roller may be mounted on the shaft 46, for cooperation with said drive wheels 40.

Securely fixed to the shaft 46, is a grooved pulley 49, and engaged in the groove of said pulley is an endless driving belt 50 which is engaged over a grooved drive pulley 51 of a motor shaft 52 of an electric motor 53, said motor being fixed to the base plate 16.

Disposed on a plane above the shaft 46 and fixedly secured in end bearings 54 which are extended from the end walls 48, is a shaft 55, and swingably mounted on said shaft in spaced relation, are a plurality of trip levers 56 having oppositely extending arms 57 and 58.

The operating end 59 of each trip lever is pivotally connected at 60 to one end of respective pull rods 61, said pull rods extending longitudinally of the base plate 16 and being pivotally secured at their opposite ends at 62 to respective calculating key levers 63, said key levers 63 being pivotally mounted on a transversely disposed shaft 64 which is fixed at its ends in respective bearings 65, said bearing 65 being extended from a respective end wall 66, said end walls being secured to and extended upwardly from the base plate 16 near the front end of said base plate.

A transverse bar 67 which is secured at its ends to the end frames 48, is disposed rearwardly of the operating ends of the trip levers 56, and connected to each operating end 59 of respective trip levers, is a coil spring 68, said springs at their opposite ends being secured to the bar 67. The coil springs 68 serve to return the trip levers 56, the pull rods 61 and the calculating key levers 63, to their neutral positions, after said parts have been operated by actuation of the key levers of which there are ten, and being numbered from "0" to "9", and each trip lever 56 being cooperably related with a respective drive wheel 40 for permitting and preventing actuation of respective wheels 40 with respective friction rollers 45 of the roller shaft 46.

With further regard to the trip levers 56, the arm 57 of each is provided with a pair of right angular projections 69 and 70, as shown in Figs.

1, 2 and 4, said projections of each lever being spaced from each other and the projection 69 being on a plane lower than the projection 70, the purpose of said projections being for cooperation with a laterally projecting stop pin 71 on respective drive wheels 40, the projection 69 of respective levers 56 being normally in the path of travel of and in abutment with, a pin 71 of respective drive wheels 40 for retaining and holding the drive wheels against operating movement.

The projection 70 of each trip lever is normally held away from the path of travel of the pins 71 of respective drive wheels 40, by reason of said projections 70 being on a plane above respective projections 69. However, when respective calculating key levers 63 are operated and a relatable trip lever 56 is rocked or swung on the shaft 55, the projection 69 of the relatable trip lever 56 will be lowered to a plane beneath the pin 71, and simultaneously the projection 70 will be lowered to the position in the circular path in which the pin 71 will travel, when the relatable drive wheel is rotated (Fig. 4), and will be engaged thereby, thus preventing the drive wheel 40 being further rotated in the event the relatable actuated trip lever 56 has not been returned to its neutral position by release of the relatable calculating key 63 by the operator. However, upon return of the actuated trip lever 56 to its neutral position, the projection 70 thereof will be swung upwardly from the pin 71 and the projection 69 will be simultaneously moved upward to receive and hold said pin 71.

With further regard to the actuation of the trip levers 56 by operation of the calculating key levers 63 and their relatable pull rods 61, disengagement of a projection 69 from the retaining pin 71 of a relatable drive wheel 40, will permit the cam surface 72 of one of ten spring actuated cam levers 73, to become active on the projecting pin 74, which is disposed diametrically from the pin 71, but is on the opposite side of the drive wheel and on respective drive wheels.

The cam levers 73 are disposed in proximity to respective drive wheels 40, said cam levers being swingably mounted in spaced relation on a transversely disposed shaft 75, and are adapted to be actuated by respective coil springs 76 for causing the cam surface 72 of each lever to thrustingly bear against respective projecting pins 74 of respective drive wheels 40. A transverse bar 77 is disposed so as to cooperate with the spring attached ends 78 of the cam levers 73 for limiting the spring actuated movement of each cam lever.

Each drive wheel 40 on its periphery 44 is provided with a cut-away part or dished recess 79, the recesses of said drive wheels being normally disposed in alinement with each other, and the rollers 45 on the shaft 46, this alined position of the recesses 79 with respect to the rollers 45, providing for said rollers to operate free of respective peripheries 44 of the drive wheels 40.

When, however, the stop pin 71 of a respective drive wheel 40 is released by the projection 69 of a respective operated trip lever 56, the spring tensioned activity of the cam surface 72 of a cooperating cam lever 73, on the projecting pin 74, will cause the related drive wheel 40 to be turned sufficiently wherein a corner or end 80 of a peripheral recess 79, will be forced into engagement with a relatable rotating friction roller 45, and the friction roller upon engaging the periphery 44 of the released drive wheel 40, will cause the said drive wheel to be turned one revolution and to a position wherein the stop pin 71 will, upon completion of its cycle of travel, engage against the projection 69 of the trip lever 56 which has been returned to its neutral position by release of the actuated calculating key 63 and the tension activity of the relatable coil spring 68.

Obviously, upon actuating the trip levers 56 by operation of respective calculating key levers 63, relatable drive wheels 40 will be permitted rotation, and consequently relatable connecting rods 38 will be reciprocated thereby, by reason of their connection at 39 to respective drive wheels. Actuation of the connecting rods 38 will reciprocate respective bell crank levers 81, of which there are ten, and which are connected by their bifurcated ends 82 to respective pins 37 of the rack bars 24, and to which said connecting rods 38 are connected.

The bell crank levers are swingably mounted in spaced relation on a transversely disposed shaft 83 which is secured at its ends in bearings 84, extended from respective end frames 48, and pivotally connected at 85 to the upper arm 86 of respective bell crank levers 81, is an upwardly extending leg 87 having a hook 88 at its upper end.

The legs 87 serve to connect the bell crank levers 81 to respective typewriter numeral keys and/or levers 89 of a typewriter A, which is mounted and supported on the housing 18 by the cushion supports 90 thereof, being engaged in respective sockets 91 of the housing 18.

Connection of the legs 87 of the bell crank levers 81 is made by each hook 88 of said levers over-engaging a pin 92 which is laterally extended from an extension 93 of respective clamping brackets 94, one of which is secured to the vertical extension 95 of respective key levers 89. Each clamping bracket 94 is channel-shaped in transverse section and is provided with a clamping screw 96 having a mutilated head for providing detachable connection to respective key levers. The upwardly extending end 97 of each key lever 89, is connected in the usual manner to one end of respective type carrying bars 98 of the typewriter A for cooperation therewith, to cause respective type bars to be actuated in cooperation with the ribbon 99 of the platen roller 100 of the typewriter carriage 101.

Fixedly secured to the transmission shaft 22 adjacent each end, is a transmission gear 102, each being in mesh with a respective intermediate gear 103, each gear 103 being extended and supported from a respective end wall 66, and in mesh with each gear 103 is a pinion 104, each pinion 104 also being extended and supported from respective end walls 66.

From the above description in respect to the gears 102, 103 and 104 and from the disclosure of Figs. 2 and 3 of the drawings, it is to be noted that a set of said gears is consequently located adjacent each side of the structure so that the operating calculating actuations from the transmission shaft 22, will be simultaneously transferred and carried through each set of gears 102, 103 and 104. This is for the purpose of imparting rotary motion to a take-off gear 105 from one of the train of gears, and for imparting rotary motion to a take-off gear 106 from the other gear train on the opposite side, the take-off gear 105 having a grooved collar 107 securely fixed thereto, and the gear being slidably mounted on a flat-sided shaft 108 which is turnably mounted at one end in a bearing 109 which is extended from one of the end walls 66, and the other end of said shaft 108 being turnably supported in a bearing 110 which is extended upwardly and supported from the base plate 16, intermediate of its width.

The take-off gear 106 is mounted on a flat-sided shaft 111 which is turnably supported at one end in the intermediate bearing 110 and at its other end in a bearing 112, which is supported and extended from the other end wall 66 in opposite disposition to the bearing 109 in which one end of the flat-sided shaft is engaged. The take-off gear 106 is provided with a fixed or integral grooved collar 113, and engaged in the groove of said collar is a vertically extending finger 114 of a bell crank shifting lever 115, which is horizontally disposed and pivotally secured at 116 on the base plate 16. Connected to the bell crank lever is one end of a shift rod 117 which extends rearwardly of the structure above the base plate 16 and is operatively connected at its opposite end to a shifting lever 118 which is actuated by means hereinafter described in connection with the carriage traveling tape 119, for shifting the gear 106 into mesh with either of its relatable gears 103 and 104.

For shifting the gear 105 into mesh with either of its relatable gears 103 and 104 and to an inoperative position, a hand-operated lever 120 is provided, said lever being securely fixed at one end to a longitudinally disposed horizontal shaft 121 which is mounted in bearings 122 which are supported from the underside of the base plate 16, and extending upwardly from said shaft through a slot in the base plate, is an arm 123 having an extending finger 124 at its upper end which is engaged within the groove on the underside of the collar 107 of the gear 105.

Slidably mounted on the alining flat-sided shafts 108 and 111 are respective master wheels or gears 125 and 126, each having a grooved hub, and for securing said master wheels in fixed spaced relation, end members 127 of a carriage 128, are provided, the end members being engaged in the grooves of the hubs of said master gears. Extending forwardly from each end member 127, is a pointer 129 for pointing indication with the counting wheels 130 of respective accumulators 131 and 132.

The carriage 128 hereafter called the master gear carriage, in addition to being supported on the hubs of the master gears 125 and 126, is slidably supported on a transverse rod 133 which is supported at its ends at 134 in respective end walls 66, said rods being passed through the standard of the intermediate bearing 110 which supports the adjacent alined ends of the flat-sided shafts 108 and 111, and is also passed through the end members 127 of the master gear carriage 128.

The master gear carriage 128 is provided with a row of depending teeth 135 which are disposed longitudinally of the carriage, said teeth being in mesh with a segmental gear 136 which is keyed or fixed to one end of a shaft 137 which is disposed longitudinally beneath the base plate 16, and is supported in end bearings 138.

Extending forwardly from each end member 127 of the master gear carriage 128, is an arm 139, said arms having fixed thereto and supporting a relatively long locking bar 140 which is horizontally disposed and parallels the flat-sided shafts 108 and 111 and extends beneath and at all times is engaged by a plurality of locking levers 141 of respective accumulators 131 and 132 (Figs. 1, 2, 3, 10, 11 and 12).

With respect to the locking levers 141 of the accumulators 131 and 132 and the locking bar 140 of the master gear carriage 128, each accumulator is provided with a plurality of gears 142 which are loosely mounted on a shaft 143, said gears 142 projecting into the path of travel of the teeth of respective master gears 125 and 128, when the master gear carriage is moved in travel by operation of the segmental gear 136 with the teeth 135 thereof. Each gear 142 is constantly in mesh with the gear 144 of respective counting wheels 130 which bear characters "0 to 9" on their peripheries, and in addition, each counting wheel 130 is provided with a cam 145 having a recess 146 in its periphery, and offset from the recess is a tooth 147.

Each counting wheel 130 excepting the highest order counting gear has axially fixed thereto a respective gear 144, cam 145 and tooth 147, the gear 144 being on one side and the cam 145 being on the other side of the counting wheel 130 with the tooth 147 adjacent and offset from the recess 146 of the cam, as shown more clearly in Figs. 11 and 12. All of the counting wheels 130 are loosely mounted on a shaft 148 paralleling the shaft 143 on which the gears 142 are mounted, with their respective cams 145 in turning clearance with a gear 144 of a higher order counting wheel 130.

Supported in the end walls 149 of each accumulator is a shaft 150, and swingably mounted on said shaft in spaced relation are the locking levers 141, there being a locking lever as relating to each set of meshing gears 142 and 144, and turnably supported on a journal 151 which is projected from each locking lever, is a gear 152, each being under-disposed and constantly in mesh with a respective counting wheel gear 144, each gear 152 in a sense being a double gear by reason of an affixed smaller toothed gear 153 being disposed on one of the sides thereof and concentric therewith and with its teeth in staggered relation, each gear 153 having relation with the single tooth 147 of respective counting wheels 130.

As shown more clearly in Figs. 11 and 12, the gears 152 have a wider face than the gears 144 with which they are in mesh, so as to overspan the width of respective teeth 144 and the periphery of the adjacent cam 145 of a relatable counting wheel 130 of a lower order. With this limited construction and due to the locking levers 141 being tensioned by respective coil spring 154, the gear 152 of respective locking levers will be held in mesh with its relatable gear 144, and simultaneously with this meshing engagement of the teeth, an adjacent pair of the teeth of the gear 152 will be forced to dwell against the periphery of a relatable cam 145 (Fig. 10), and the gear 152 will thus be held in a locked position against turning by the relatable cam 145, and consequently all of the gears 152 in this locked position, will prevent accumulating rotation of the meshing sets of gears 142—144.

As the locking bar 140 of the master gear carriage 128 is of a length to constantly underengage the extending ends of the plurality of locking levers 141 of both accumulators 131 and 132, said locking bar 140 will prevent inadvertent retrograde movement of the locking levers 141, such as may be caused by friction from the turning of an operating counting wheel 130 by actuation of a master gear in cooperation with a gear 142 of a relatable counting wheel 130. The locking bar 140 therefore is for the purpose of preventing any actuating movement being carried to the counting wheels 130 of the accumulators, excepting a selected counting wheel of each accumulator.

For permitting actuation of the selected counting wheel of each accumulator, a recess 155 with respect to the accumulator 131 and master gear 125 thereof, is formed on the top of the locking bar 140, as shown in Figs. 2 and 3, to the left and adjacent the master gear 125, as seen in Fig. 3, and a similarly located recess 156 is shown in proximity to the master gear 126. The locking bar 140 therefore, which forms a part of the carriage 128, when shifted so that the master gears 125—126 are moved to selected operating positions in respective accumulators, will provide for locating each recess 155—156 to positions beneath respective locking levers 141 of the selected counting gears 130 with which they are related, and as said respective counting wheels are rotated by relatable master gears in mesh with relatable gears 142 and said gears being in mesh with relatable gears 144 of the selected counting wheels 130, the locking pair of adjacent teeth of relatable gears 152 will be released from locking engagement with relatable cams 145, by turning actuation of the teeth of relatable gears 144, by reason of the fact that the relatable locking levers 141 on which the gears 152 are mounted, will be permitted retrograde action by the extending ends of said levers being forced into respective recesses 155—156.

Immediately upon discontinuance of turning actuation on the selected counting wheels 130, the locking lever 141 of each accumulator which was actuated, will be returned to its neutral position by its attached spring 154 and an adjacent pair of teeth of the gear 152 of each locking lever, will be brought into locking engagement with the periphery of the relatable cam 145. During the revolving of the selected counting wheels 130, all of the remaining counting wheels of both accumulators were prevented from being inadvertently turned by reason of their relatable locking levers 141 being prevented from retrograde movment on account of the extending ends of said levers being engaged on the top of the locking bars 140, and consequently, overriding motion was prevented from being imparted to unselected counting wheels 130, excepting those which were selected to be operated on.

Provision, however, is made for actuating the counting wheel 130 which is next in higher order in totalizing, to the selected counting wheel being actuated, while the locking levers 141 are held in locked relation.

The actuating of an adjacent locked counting wheel 130 is accomplished by cooperation of the tooth 147 of the selected counting wheel with the gear 153 affixed to the gear 152 of the lever 141 of the said adjacent locked counting wheel. In this connection, the tooth 147 upon being brought into meshing relation with the gear 153 by operation of the selected counting wheel 130, will cause the locked adjacent counting wheel to be turned a pre-determined distance of one-tenth of a revolution, to position the next designating number or digit on the periphery of the locked counting wheel, at the sight opening 157 in the housing 18, and simultaneously, a tooth of a relatable gear 152 will engage the recess 146 of the cam 145 of the locked counting wheel 130, thus momentarily breaking the locked relation of said gear 152 with its cam 145.

The accumulator 132 is stationarily fixed to the base plate 16 with its plurality of gears 142 disposed in traveling alinement with the master gear 126 of the carriage 128. The accumulator 131 which is disposed to the left of the accumulator 132, is mounted in trackways 158 which are fixed to the base plate 16, said accumulator 131 being normally held by a coil spring 159 in a position against a stop 233 wherein the alined gears 142 thereof are held from the alining travel of the teeth of the master wheel 126 of the carriage 128.

Means are provided however, for automatically moving the accumulator 131 in its trackways 158 to a position wherein the gears 142 thereof will be in alinement with the travel of the teeth of the master gear 126, said means comprising a pull rod 160 which is connected to the cross bar 161 to which one end of the coil spring 159 is connected (Figs. 1, 2, and 12), the other end of said rod extending longitudinally above the base plate 16 and being secured at 162 to the arm 163 of a bell crank lever 164 which is horizontally swingable on the pin 165 which is extended from a plate 166 secured on the base plate 16.

A trip lever 167 is pivotally secured at 168 to the bell crank lever 164, said trip lever 167 having an end 169 extending beneath the carriage moving tape 119 and is adapted to be engaged by a stud 170 which is secured to and depended from the tape 119, when the tape is traveled to the right in Fig. 9, said lever 167 being spring actuated and held against a stop 171 which is extended from the bell crank lever 164 so that the lever 167 will be caused to swing the bell crank lever 164 on the pin 165 by actuation of the stud 170 against the lever 167, thus swinging the arm 163 to a position wherein the end 172 will clear a projection 173 of a lever 174 which is horizontally swingable at 175 to the plate 166.

When the bell crank lever 164 is actuated by engagement of the stud 170 of the carriage moving tape 119, engaging the projecting end 169 of the trip lever 167, the swinging of the arm 163 of the lever 164 will pull the rod 160 and the accumulator 131 with which the rod is connected, to a position wherein the plurality of gears 142 of said accumulator will be in traveling alinement with the master gear 126 of the carriage 128, and the accumulator 131 will be held in this position by the end 172 of the arm 163, over-engaging the projection 173 of the lever 174, said lever 174 being actuated by the spring 176 to move the projection 173 thereof, into under-engagement with the end 172 of the lever 164 (Fig. 9).

The lever 174 is provided with a pivoted spring actuated trip lever 177 which has an end 178 projecting beneath the carriage moving tape 119, said projecting end of the lever 177 being in traveling alinement with the stud 170 of said carriage tape, and is adapted to subsequently be engaged by the stud 170 during traveling of the tape 119, said trip lever 177 when so engaged, operating with the stop 179 to swing the lever 174 on its pivot 175 for subsequently releasing the projection 173 of the lever 174, from engagement with the end 172 of the bell crank lever 164, said lever 164 when so released, being moved to its normal position by the retracting of the coil spring 159 (which is weaker than the spring 176) of the accumulator 131 and the rod 160, the accummulator thereby being released from its operating position with the master wheel 126 of the carriage 128.

The shaft 137 which extends longitudinally beneath the base plate 16 and having the segmental gear 136 fixed thereto at one end, is provided at its opposite end with a fixed member 180 for the support of a toe lever 181 which is pivoted at 182 to said member, said toe lever being normally held against a seat 183 formed on the member 180 by a retractile spring 184 which is secured to the member 180 and the toe lever 181. A retractile spring 185 is secured at one end to an ear 186 formed on the member 180 and at its opposite end to the screw eye 187 depended from the base plate 16.

The member 180 and the toe lever 181 is projected through a slot 188 formed in the base plate 16, and the toe lever 181 is disposed in traveling alinement with a series of spaced alined studs 190, of which there are four, and are depended from and secured to the carriage moving tape 119, each stud 190 in turn, when traveled in one direction by the carriage tape 119, engaging with the toe lever 181, thereby rocking the member 180 and the shaft 137 and the segmental gear 136 thereof, in engagement with the teeth 135 of the master gear carriage 128, will move the master gears 125 and 126 thereof, into operating positions with respective accumulators 131 and 132 (Figs. 1, 2, 3 and 6).

The carriage moving tape 119 is connected at one end to the typewriter carriage 100 by the screw 191 and washer 192 (Figs. 1 and 3), said carriage tape passing over an upper disposed guide roller 193 and a lower disposed guide roller 194 which are supported from a standard 195 by respective bolts 196, and disposed in horizontal alinement from the roller 194 adjacent the opposite side of the base plate 16, is a guide roller 197 which is supported on a bolt 198 which is extended from a bracket 199.

The carriage tape 119 extends horizontally beneath the rollers 194 and 197 and above the base plate, as shown in Figs. 1, 3, 6, 7 and 8, and is secured at its other end to a sheave drum 200 which is operated in a tape winding direction by an encased clock spring 201 which is secured at one end at 202 to the inner periphery of the casing 203 of said clock spring, and at its inner end at 204 to the bolt 205 on which the drum 200 is turnably mounted, said bolt 205 being extended from the supporting bracket 206 which is secured to the base plate 16.

The carriage moving tape 119 is also provided with a pair of studs 207 which are disposed in alining travel on the tape inwardly of the series of studs 190, the studs 207 having the same spaced relation as the first two of the studs of the series of four studs aforementioned and designated 190, but each stud 207 being disposed a corresponding distance in advance on the tape to each respective stud 190 of the first two studs of the series of studs 190.

The reason for this peculiar disposition of the studs 207 with respect to the first two studs of the series 190, is so that a stud 207 of each corresponding stud 190 will respectively engage one side of the pointed end 208 of the shifting lever 118 which is pivoted at 209 to the base plate 16 while a relatable stud 190 will simultaneously be brought into engagement with the toe lever 181 of the member 180, which is securely fixed to one end of the shaft 137 (Figs. 2 and 3).

The engagement of the stud 207 with one side of the pointed end 208 of the shifting lever 118 will swing the outer extending end of said lever to the position shown in dotted lines in Fig. 2, and in this position the rod 117 will hold the takeoff gear 106 in mesh with its relatable intermediate gear 103 by cooperation with the bell crank shifting lever 115. The meshing engagement of the takeoff gear 106 with its relatable intermediate gear 103 will provide for the transferring of adding calculation to the accumulator 132 by cooperation of the master gear 126 therewith, when the master gear carriage 128 is shifted to an operating position by actuation of the shaft 137.

Disposed in rearward position on the carriage tape 119 are a pair of studs 210, said studs 210 being in traveling alinement with one another on the tape, but are out of traveling alinement with the pair of studs 207.

Each of the studs 210 is disposed correspondingly forward to respective studs of the last two studs designated 190, said studs 210 each being adapted to cooperate with the other side of the pointed end 208 of the shifting lever 118 for swinging it, to move the rod 117 to shift the takeoff gear 106 into disengaging position with its intermediate gear 103 and into meshing engagement with the relatable reversing gear 104 for transferring subtracting calculation from the master wheel 126 of the carriage 128 to the accumulator 132, when said carriage is shifted to actuating position by cooperation of the shaft 137 by engagement of either of the last two studs of the series of studs 190 with the toe lever 181 of said shaft.

In Figs. 5 and 6, the respective studs 190 and 210 are shown in corresponding positions, the position of the stud 190 shown in dotted lines, indicating its location with that of the corresponding stud 210 when said stud 190 engages the toe lever 181 simultaneously with the lug 210 engaging the pointed end 208 of the shifting lever 118. The advanced positions of the respective lugs 190 and 210 shown in said Figs. 5 and 6, indicate that the member 180 has been rocked by the stud 190 engaging and pushing the toe lever 181 of said member and that the stud 210 has cleared the shifting lever 118 after engaging the pointed end 208 of said lever and actuating said lever.

As the operation of the studs 170, 190, 207 and 210 with the respective parts to be actuated, may tend to buckle the horizontal run of the carriage tape 119, a relatively long seating or bearing plate 211 is provided, said plate being in the form of a bracket which is secured to the base plate 16, and has portions 212 and 213 for guiding engagement with the side edges of the carriage tape 119.

The shifting lever 118 which is shown more clearly in Figs. 5, 6, 7 and 8, when specifically defined, comprises a longitudinal member 214 having a hooked end 215 which is under-engaged in an aperture in the supporting bar 216.

The member 214 has the pointed end 208 which is raised, and there adjacent is a pair of legs 232 depending from the member 214 in straddling relation with the bar 216, and interposed between said bar and the member 214 is a seated coil spring 217, said spring serving to hold the pointed end of the member 214 in elevated position for engagement with respective studs 207—210.

The traveling direction of the carriage tape 119 for moving the typewriter carriage 100 to different writing positions as occasioned by actuation of the studs 190 on the toe lever 181 of the carriage operating shaft 137, is in the direction of the arrow 218 shown on the horizontal run of the carriage tape, in Fig. 2, and when the carriage tape is moved in an opposite direction in returning the carriage and restoring the power tension of the clock spring 201 of the winding drum 200, the several specified operating studs of the carriage tape, will engage and pass the mechanisms with which they cooperate, without effecting any operating actuation on said mechanisms for the following reasons:

The member 214 of the shifting lever 118 on account of being anchored by the hooked end 215 of the bar 216, will be permitted to be swung downwardly against the tension of the spring 217, as the studs 210—207 are engaged thereover and the activity of the spring 217 will return the member 214 to its normal position after each stud has passed thereover (Fig. 7).

Also, as shown in Fig. 7, the studs 190 upon being returned, will each engage and rearwardly force the toe lever 181 in a retarded position, and the spring 184 thereof will subsequently return the toe lever against its seat 183.

With respect to the trip levers 167—177 of respective levers 164—174, said trip levers will be moved ineffectively by returning travel of the stud 170 of the carriage tape 119.

The key levers 89 of the typewriter and the key levers 63 of the calculating attachment, are equal in number and are correspondingly designated with characters from "0 to 9," said key lever groups being separably manually operated, the calculating attachment group of key levers being operated only when calculating is desired, and the typewriter key lever group being operated in transcribing ordinary correspondence in which calculating is not desired. To avoid confusion by the operator so that the typewriter key group cannot be operated when calculating is desired, a guard 219 hinged at its ends at 220 to respective legs 221 which extend from respective end frames 48, is located adjacent the typewriter key lever group, and operably connected to an arm 222 at one end of the guard 219 is a shift rod 223 which extends downwardly and is connected at its other end to a bell crank lever 224, pivoted at 225 to an extension 226 of the frame 19.

Connected to the opposite end of the bell crank lever 224, is a rod 227 which extends to and is connected to one end of a bell crank lever 228. The bell crank lever 228 is pivoted to a standard 229 which is secured to and extends upwardly from the base plate 16 (Figs. 1, 2 and 3), said bell crank lever having a depending end 230 which is adapted to be engaged and operated by one of the end members 127 of the master gear carriage 128, when the carriage is returned to a neutral position, this position of the carriage through the parts 219 to 230 inclusive, operating to hold the guard 219 in an uncovering position in respect to the typewriter key lever group so that they are exposed for operation.

When however, calculating is to be carried on, each stud 190 of the four stud group of the typewriter carriage tape 119 will in turn engage the toe lever 181 of the shaft 137, thereby rocking said shaft and causing the master wheel carriage 128 to be traveled to calculating positions by operation of the segmental gear 136 of said shaft 137 on the teeth 135 of the carriage 128. As the end frame 127 of the carriage 128 disengages the contacting end 230 of the bell crank lever 228, a retractile coil spring 231 which is connected at one end to the ball crank lever 222, and at its opposite end to the extension 226 of the frame 19, will swing said lever and upwardly push the rod 223, and the guard 219 will be swung thereby into covering position over the typewriter lever numeral key group, in a manner as shown in dotted lines in Fig. 1.

Located in proximity to the extending ends of the arms 58 of respective trip levers 56, rearwardly thereof, and supported in bearings 234 of the end frames 48, is a transverse shaft 235. The shaft 235 is provided at one end with an operating button 236 and an electric switch 237 there adjacent, said shaft intermediate its ends having a crank throw part 238 which over-engages a catching portion 239 formed on each arm 58 of respective trip levers 56, when the switch 237 is in open position in respect to the switch terminals 240—241 (Fig. 1).

Each switch terminal 240—241, has a branching end 242 of one of the circuit wires of an electric extension plug cord 243 connected therewith, the extension cord 243 being adapted to connect with an electric supply source for operating the motor 53. The switch 237 is provided with a contacting plate 244 which is adapted to bridge the switch terminals 240—241 for closing the current circuit of the motor.

When this improved calculating attachment is to be operated in connection with a typewriter for posting or making out bills, statements and the like, a posting sheet such as shown in Fig. 17 and designated at B, is inserted in the typewriter carriage 101 of the typewriter A in engagement with the platen roller 100 and the typewriter carriage is moved into writing position by the ordinary intermittently operated escapement means (not shown) of any standard typewriter wherein the typewriter carriage is propelled from right to left on the typewriter. The motor 53 is then put into operation by turning the shaft 235 to close the electric switch 237, to cause the motor through the pulley 51 thereof and the belt 50, to operate the pulley 49 to rotate the shaft 46 on which the rollers 45 are mounted.

Turning of the shaft 235 will move the crank throw part 238 thereof, away from over-engagement with the catching portion 239 of respective trip levers 56. The calculating attachment is then ready for operation.

Upon actuation of any of the key levers 63 by the operator, relatable pull rods 61 will actuate respective trip levers 56, thereby releasing the projection 69 of the actuated trip lever 56 from engagement with the stop pin 71 of the relatable drive wheel 40, thereby permitting the cam lever 73 to bear against and push a relatable projecting pin 74 so that the drive wheel 40 will be moved to a position wherein the corner 80 on the periphery 44 of the drive wheel, will be engaged by a relatable revolving roller 45. The drive wheel 40 will be turned one revolution by rotating engagement of the roller 45 with the periphery 44 of the drive wheel 40, the drive wheel being stopped from further rotation by reason of the stop pin 71 thereof, abutting against the projection 69 of the lever 56 upon completion of the revolution.

During the one revolution turn of the actuated drive wheel 40, the relatable connecting rod 38 which is connected thereto at 39, will reciprocate said connecting rod for one cycle of reciprocation, and the rack bar 24 which is connected to the connecting rod 38 by the pin 37, will be similarly reciprocated, thereby actuating the relatable bell crank lever 81.

The leg 87 of the bell crank lever 81 which is connected by the hook 88 over the pin 92 of the clamping bracket 94, to the vertical extension 95 of a relatable key lever 89, will draw down upon and actuate the relatable numeral key lever of the typewriter A, to cause the type bar 98 of said lever 89 to be actuated against the platen roller 100 and cooperating ribbon 99 of the typewriter carriage 101.

On the first half-cycle of travel of the operating connecting rod 38 and its relatable rack bar 24, the tooth rack 28 of said bar 24 under-engaged and meshed with the teeth of the relatable pinion gear 23 on the transmission shaft 22, thereby imparting rotary motion to said gear and shaft to the extent of the number of teeth on the rack 28 corresponding to the value or denomination of the actuated calculating key lever 63, and the stop 36 of the rack bar 24 will be engaged between a pair of teeth of the gear 23 for preventing overriding momentum of said gear.

Upon completion of the actuating cycle of travel of the tooth rack 28, said tooth rack will be swung downwardly on its pivot 27 by the spring 245 which is secured at one end to an ear 246 which is depended from the toothed rack 28, said spring at its opposite end being connected to a transverse rod 247 which is supported at its ends in respective extensions 226 of the frame 19. The swinging of the toothed rack 28 will dispose the pin 29 thereof, on a horizontal plane beneath the flange 30 of a relatable trip lever 31, with the teeth thereof out of mesh with the gear 23, and the rack will be held in this disengaged position while being traveled on its return cycle (Figs. 4 and 14).

Upon the rack bar 24 and the toothed rack 28 carried thereby, being returned to its neutral position, the spring 245 will immediately become active to return the toothed rack 28 to its neutral position, so that the teeth thereof, will be again in alinement for cooperation with its relatable gear 23, ready to repeat "stepping calculation" on the gear 23 when the relatable calculating key 63 is again actuated.

The reason the spring 245 is capable of swinging its relatable toothed rack 28 into and out of engagement with its relatable gear 23, is because of the spring being connected at its lower end to the ear 246 of the toothed rack 28, in a position rearwardly of the pivot 27 of the toothed rack, when said toothed rack is in neutral position, as shown in Fig. 1, and said spring when the toothed rack is moved on its actuating cycle, being positioned forwardly of the pivot 27 of the toothed rack, as shown in Fig. 4. This manner of actuation of the spring 245 on the toothed rack 28, is occasioned by the location of the rod 247 to which the spring 245 is secured at its upper end.

Each toothed rack 28 is provided with a similar ear 246 to which a respective spring 245 is secured at one end, said springs at their opposite ends being connected to the rod 247, and in addition, each rack is provided with a laterally projecting lug 248 for under-engagement with respective rack bars 24, against the tension of respective springs 245.

When the toothed rack 28 is swung downwardly to engage the pin 29 thereof, on a plane beneath the flange 30 of the relatable trip lever 31, said relatable trip lever will be simultaneously swung upwardly by its spring 34, immediately upon the pin 29 reaching the end of the flange 30 upon the first operating cycle of the toothed rack 28, thus cooperating to over-engage the pin 29 of the rack 28.

While a respective trip lever 31 is shown, for cooperation with the pin 29 of respective tooth racks 28, if desired, the trip levers may be made in a unitary structure wherein the extending ends of said levers may be tied to one another, and the structure having end bearing only, with the rod or shaft 32.

The value relating to the denomination of the actuated calculating key 63 was imparted to the transmission shaft 22, and the transmission gear 102 on each end of said shaft transferred the calculated value to respective intermediate gears 103 and reverse gears 104 and respective relatable take-off gears 105—106, to respective relatable flat-sided shafts 108—111 and their respective relatable master gears 125—126, from where the calculated value of the operated key lever 63 is transferred to relatable accumulators 131—132, as the master gear carriage 128 is moved to position the master gears into transferring positions with relatable accumulator gears 142, so as to carry the calculated value to relatable counting wheels 130 of the respective accumulators 131—132.

As the posting sheet B, shown in Fig. 17, is provided with a series of four posting columns C, D, E and F, which correspond in number to the alined studs 190 on the typewriter carriage moving tape 119, it is obvious that the first stud 190 in the traveling direction of the typewriter carriage moving tape 119, will be the first stud to engage and operate the toe lever 181 to rock the shaft 137 for intermittently moving the master gear carriage 128 (by the cooperable typewriter carriage escapement means not shown, which is released by actuation of any of the typewriter key levers 89) to a position wherein the master gears 125—126 thereof, can operatingly transfer into their relatable accumulators 131—132, the calculated values into the accumulators simultaneously with the same calculated values being imprinted or typed in the first column C of the posting sheet B to indicate "old balance."

On the initial movement of the master gear carriage 128 by actuation of the segmental gear 136 with the teeth 135 of said carriage, the guard 219 was operated to a closing position over the designating buttons of the typewriter key levers 89 by the retracting of the spring 231 on the shift rod 223 upon release of the depending end 230 of the lever 228, by the master gear carriage 128.

With further regard to the typewriter carriage moving tape 119 and the studs 190 thereof, from an inspection of Figs. 2 and 3, it is to be noted that the first stud 190 in the order of operating travel, is spaced a considerable distance away from the second stud 190, comparable with the spaced distance of the second and third and the third and fourth studs 190.

The larger spaced relation of the first and second studs 190, is adapted to correspond with the spaced relation between the columns C and D of the posting sheet B, so that the operator can by operation of the typewriter keys, imprint a monthly date in the column G, a department number in the column H and a description of the goods sold, in the column I on the posting sheet B in the intermediate space between the posting column C and D on the posting sheet, as during the operation on the typewriter keys, the master gear carriage 128 will be held in an inactive position, and during which time the guard 219 will be held in an uncovering position with respect to the designating buttons of the typewriter keys 89.

After typewriting has been done in the columns G, H and I, the second stud 190 in the order of the typewriter carriage tape travel, will engage the toe lever 181 of the rock shaft 137, and through the segmental gear 136 and the teeth 135 of the master gear carriage 128, will move said carriage whereby calculated values may be simultaneously transferred through the master wheels of the carriage to relatable accumulators 131—132, simultaneously with the typing of said values on the posting sheet in column D, denoting "debit," and of course the designating buttons of the typewriter key 89 will have been again covered by the guard 219 so that the operator will not be confused, as may be likely in the event that the typewriter key buttons, were exposed.

Each time the toe lever 181 of the rock shaft 137 is released by respective studs 190, the retractile coil spring 185 which is connected at one end to the member 180 to which the toe lever 181 is pivotally mounted, will return said parts and the master gear carriage 128 with which they are related, to their neural positions.

The third stud 190 of the series of four studs, when engaged by operating travel of the typewriter carriage tape 119, against the toe lever 181 of the rock shaft 137, will also cause the master carriage 128 to be moved to calculated value transferring positions so that the master gears of the carriage can cooperate with their respective accumulators 131—132, for entering or totalizing the amounts to be indicated in the column E signifying "credit."

When the fourth and last stud 190 of the series of four studs, is traveled to a position of engagement with the toe lever 181, the master gear carriage 128 will be moved to positions wherein the master gears thereof, will transfer the calculated value which is being entered by the typewriter keys in the column F, denoting "new balance," on the posting sheet B, to the accumulators 131—132.

From the afore-description with respect to the studs 190 on the typewriter carriage moving tape 119, it is clear that said studs are solely for the purpose of intermittently moving the master gear carriage and the master gears thereof, into calculating positions with the accumulators 131—132.

The alining pair of studs 207, the alining pair of studs 210 and the stud 170, which are also carried by the typewriter carriage moving tape 119, however, have their functions which are adapted to be performed in one of the many forms of bill posting and/or bookkeeping which are possible by the structure of the calculating attachment here described and shown in connection with the typewriter.

In order to bring out the function of the studs 207, 210 and 170, in coinciding operation with the studs 190 of the typewriter carriage moving tape 119, attention is directed to the posting sheet B, shown in Fig. 17, and the calculated values designated thereon in the columns C, D, E and F.

In order to enter the calculated values shown on the posting sheet B, column C is located in typing position by an adjusted tabulator stop on the typewriter A (not shown), and simultaneous therewith, the master gear carriage 128 is moved to calculating positions with respect to the accumulators 131—132 by operation of the first stud 190 on the carriage moving tape 119, and the shifting lever 118 is also simultaneously engaged and moved by the first stud 207, to exert a pull on the rod 117 for actuating the bell crank lever 115 to shift the take-off gear 106 into meshing relation with its relatable intermediate gear 103, so that the shaft 111 on which the master gear 126 is slidably mounted, will be actuated in adding direction in respect to the counting wheels 130 of the accumulator 132.

When the column C of the posting sheet B is thus positioned, and the operator in setting out the value of "$18.60," positions the master gear 126 so that said gear will cooperate with and transfer to respective accumulator gears 142 which extend in the path of longitudinal travel of the master gear 126, the value of "18.60" by actuation of the relatable calculating key levers 63, bearing relatable designating characters. The accumulator 132 will thus show the old balance of "18.60," as shown thereon in Fig. 2, and correspondingly said amount or value will be printed in the "old balance" column C.

When the last calculating key 63 designating the character "0" is operated, the master wheel 126 and carriage 128, is in the position indicated in dotted lines in Fig. 2, and from this position the carriage is returned to its neutral position by the spring 135, and the operator by actuation of the typewriter keys only, will write the requisites in the columns G, H and I, on the same line on which the old balance of "$18.60" has been imprinted, and by the time that the typewriter carriage 101 bearing the posting sheet B is located in typing position in the column D, the second stud 190 of the carriage moving tape 119, will operate to move the master gear carriage 128 to transferring positions wherein the master gears 125—126 will be located to transferring positions with their respective accumulators 131—132.

It is to be noted that when the amount of "$18.60" was entered in column C and indicated in the accumulator 132, that the master wheel 125 was inactively passed by its relatable accumulator 131 by reason of said accumulator being withheld from engagement therewith by the spring 159. When, however, the second stud 190 engages the toe lever 181 to move the master gear carriage 128 to calculating positions in respect to the accumulators 131—132, the second stud 207 will also engage the shift lever 118 to either reengage or hold the take-off gear 106 in mesh with its relatable intermediate gear 103, and simultaneously therewith, the stud 170 will cooperate with the projecting end 169 of the trip lever 167 on the bell crank lever 164, to exert a pull on the rod 160 for drawing the accumulator 131 into the position wherein the accumulating gears 142 thereof, will be projected into alinement with the travel of the master gear 125, the accumulator 131 being held in this position by the end 172 of the bell crank lever 164 overengaging the projection 173 of the cooperating lever 174.

With further regard to the posting sheet B and the "debit" column D thereof which shows the amount of "10.40," indicating the value of an additional charge for "1 dress," upon actuation of the calculating keys 63 bearing corresponding characters, the amount of "10.40" will be simultaneously indicated in the column D, and the accumulator 131, whereas in the accumulator 132, this amount will be added to the heretofore indicated "18.60," thus indicating an amount of "29.00" in 132 accumulator.

The additional charges of the separate items "1 hat" and "1 pair shoes" shown in column I of the posting sheet B, for which the amounts of "2.90" and "4.50" were respectively charged, are entered by shifting the typewriter carriage to the typewriter writing positions to describe them in the columns G, H and I, and of course when the calculating keys 63 bearing characters corresponding to the charge "2.90" are operated to be printed in the column D, the amount "10.40" heretofore indicated in accumulator 131, will be changed by adding the amount of "2.90" so as to indicate "13.30" in the accumulator 131, because the stud 170 on the typewriter carriage tape 119, will have again been operated to shift the accumulator 131 into operating alinement with its relatable master gear 135. Simultaneous with the entry of the charge "2.90" in the accumulator 131, said amount will be added to the heretofore amount of "29.00" in accumulator 132, thus indicating the amount of "31.90" in accumulator 132.

Similarly, the charge of "4.50" is subsequently added to the amount of "13.30" heretofore indicated in accumulator 131, thereby making a total reading of "17.80" in said accumulator, as well as said amount being added to the heretofore indicated amount of "31.90" in accumulator 132 so that said accumulator 132 will now show a total of "36.40."

From the above description in respect to the charged values in the "debit" column D on the posting sheet B, it is clear that said entries were made on the posting sheet simultaneously with them being totalized in the accumulator 131 to the amount of "17.80" as indicated in said accumulator, in Fig. 2.

As the entry of the value "4.50" is the last posted entry in the "debit" column D of the posting sheet B, and as in this instance there are no entries to be posted in the "credit" column E, the typewriter carriage 101, is moved to a writing position in the "new balance" column F, without making any entries in the "credit" column E. During this movement of the carriage 101, by the carriage tape 119, there was simultaneous operation of the third stud 190 and the first stud of the pair of studs 210 of the tape 119, on the toe lever 181 and the shifting lever 118, respectively, to move the master gear carriage 128 into calculating transferring positions, and to shift the take-off gear 106 into meshing engagement with its relatable reversing gear 104, even though the operator omitted making entry of a credit value of column E.

When the posting sheet B is positioned by the typewriter carriage 101 to writing position in the "new balance" column F, the master gear carriage 128 obviously has been correspondingly positioned by engagement of the last stud 190 with the toe lever 181 to actuate relatable mechanisms for locating the cariage in this position, and of course, the second stud of the pair of studs 210 will have operated the shifting lever 118, to disengage the take-off gear 106 from the gear 103, and to engage said gear 106 with its relatable reversing gear 104, in the event that the shifting lever 118 has been shifted from the position in which it was placed by the first stop 210 which corresponds with the "credit" column E.

The operator upon making entry in the "new balance" column F, will operate the calculating keys 63 which have the characters corresponding to and designating the value "36.40" which is shown in the accumulator 132, this last entry completing the posting of the sheet B of the debtor to which credit has been extended. Simultaneously with the operation of the calculating keys 63 designating "36.40," the corresponding counting wheels 130 will be operated to positions to indicate "00.00" on account of the reversing operation imparted thereto by the take-off gear 106 which has been placed in mesh with the reversing gear 104, thus clearing the accumulator 132, ready for posting the next bill.

In clearing the accumulator 132 by substraction, if an error is made by the operator in copying the total "36.40" and "35.40" was copied instead, a balance of "1.00" will show in the accumulator, thus indicating the error.

As many establishments, in making out bills and the like, post the debits and credits separately, the amount of "17.80" which was totalized in accumulator 131 from the entries made in the "debit" column D on the posting sheet B, is permitted to remain in the accumulator so that other debit values when entered in the "debit" column of successive posting sheets during a period of one day's time, may be accumulated and totalized in the accumulator 131 to show the total of debits accumulated during that billing day.

In posting credits, the posting sheet B is again engaged in the typewriter carriage 101 to enter the items J with which the customer is to be credited on the posting sheet in the relatable columns thereof. To post the credits and to accumulate the credits during posting, in order to acquire a total of the credits entered over a posting period, the stud 170 on the carriage moving tape 119 is removed and secured in the aperture 249 (Fig. 2) formed in the tape 119, said stud 170 when so located, being positioned to actuate the bell crank lever 164 by engaging the trip lever 167 thereof, to place the accumulator 131 into operating alinement with the master gear 125, when entries are made in the "credit" column E.

In posting the items J for credit purposes, the required accumulator keys 63 are actuated to print "36.40" in the "old balance" column C, and the like value is transferred in accumulator 132 by the first stop 190, causing the relatable mechanisms to operate the master gear carriage to transferring position in relation to accumulator 132. The typewriter carriage 101 is then moved or tabulated for posting the requisites in the columns G, H and I, as relating to "By ret'd—1 hat" and is subsequently positioned so that the "credit" column E will be in writing alinement, and when the calculator keys 63 are operated to type the characters "2.90" in said column, the accumulator 131 will have been moved into receiving cooperation with the master gear 125 so that the "2.90" value of the "returned hat" will be transferred into said accumulator as said value is entered in the "credit" column E.

As the take-off gear 106 has been placed in mesh with the reversing gear 104 by the shifting lever 118 being actuated by the first stud 210, the master gear 126 will be turned in subtracting directon to deduct the value of "2.90" from the accumulator 132.

After entering the credit "2.90" in the credit column E, the typewriter carriage 101 is returned to the position in order to enter the "By cash" item in column I and after which the typewriter carriage is tabulated to the position to enter the amount of "18.60" in the credit column E, this amount being accumulated in the accumulator 131 and is simultaneously subtracted from the accumulator 132, said accumulator 132 then showing a balance of "14.90" whereas the accumulator 131 will show a total of "21.50" which signifies the amount the customer has been credited with. The typewriter carriage is then tabulated to writing position in the "new balance"

BEST AVAILABLE COPY column F and the operator will then copy the balance "14.90" from the accumulator 132, the operation of relatable calculating keys 63 imprinting said balance in the "new balance" column F, and simultaneously substracting the value of said balance from the accumulator 132, thereby clearing said accumulator in readiness for the next posting sheet to be inserted for credit posting.

To accomplish bill posting, of the character described, including the posting of debits and credits, it is clear that the arrangement of the reversibly operable alined disconnected flat-sided shafts 108 and 111 of respective master gears 125—126, form essential requisites therefor, and the accumulators 131—132, respectively.

From an inspection of Figure 13, it is to be noted that each of the studs 190 and 207 shown in said figure, is provided with a threaded shank 250, each stud being projected through a respective aperture which is formed in the typewriter carriage moving tape 119 and is threadingly engaged in a respective lock nut 251 which is seated in respective counter-sunk recesses 252 formed in the tape 119. However, the studs may be secured in any suitable manner. The tape 119, if desired, may be of spring steel or it may be made from a closely woven strong fabric.

When no bill posting is required over a period of time and it is desired to use the typewriter only, the seating or bearing plate 211 which may be made of two relatable parts K and L, as shown in Figs. 15 and 16, can be adjusted relative to one another to retain that portion of the horizontal run of the typewriter carriage moving tape 119, in a position whereby the studs 190, 207, 210 and 170 will be withheld from operating contact with the toe lever 181, the lever 118 and the levers 164 and 174, respectively.

For providing the adjustment of the part K of the seating plate 211 relative to the part L, the part L is fixedly secured to the base plate 16, and the vertically walled portion 253 of the part K is held in slidable contact with the vertically walled portion 254 of the part L, by the vertically alined pairs of headed pins 255 which are extended from the wall 254, into respective guiding slots 256.

The part K is provided with a pair of longitudinally extending lips 257 which under-engage respective edges of the typewriter carriage moving tape 119, and formed in the wall portion 253 is an intermediately disposed elongated opening 258 in which a cam 259 is disposed, said cam being fixedly secured to one end of a hand operated shaft 260 which passes through the walled portion 254 of the part K at a right angle thereto, and has bearing connection at 261 therewith.

The shaft 260 may be extended rearwardly of the calculating attachment, and when the shaft is operated to locate the cam 259 thereof in the position shown in Fig. 15, the seating plate 211 and/or part K thereof, will be retained in elevated position in respect to the part L, and the portion of the carriage moving tape engaged between the lips 257 of the part K, will hold that portion of the carriage moving tape 119 in elevated position when the typewriter carriage is moved by the tape, and consequently, the studs carried by the tape will be withheld from actuating contact with the operating parts for the calculating attachment.

For lowering the part K of the seating plate 211 to position the typewriter carriage moving tape 119 so that the studs carried thereby, can engage the mechanisms with which they are adapted to cooperate, the shaft 260 upon being returned in a reverse direction, will cause the thrusting periphery of the cam 259 to bear against the lower side of the opening 258, and the part K will be also held in its lowered position by the cam.

For holding the legs 87 in sliding contact with their relatable pins 92 of the clamping brackets 94 so that the pins 92 may be maintained in alining travel with respective hooks 88 of the legs 87, a spring 262 is connected at one end to a respective leg 87 and at its opposite end to the arm 86 of respective bell crank levers 81, as shown in Fig. 1.

From the aforegoing description comparable with the several figures of the drawings, it is clear that a unique combination of relatable elements is provided for adaptably combining a calculating attachment device with a writing machine and/or typewriter whereby a unique manner of calculating can be accomplished, and at the same time, the calculating results are automatically transferred and imprinted through the medium of the typewriter.

Having thus described the invention so that those skilled in the art will be able to practice the same, it is obvious that constructional modifications of the device are possible without departing from the spirit and scope of the present invention, and therefore it is to be understood that it is not necessary to limit the invention by the terms used in the foregoing description, excepting such as the state of the art may require.

What I claim is:

1. A calculating device having an electric motor, a friction surfaced shaft driven by said motor, a series of alined drive wheels for intermittent peripheral contact with said shaft, a releasable element for each drive wheel, an electric switch for controlling the current for operating said motor and having a part for locking cooperation with said elements of said drive wheels, a calculating mechanism having a part connected to each drive wheel, and calculating key levers having cooperable connection with said elements.

2. A calculating device having a power actuated friction surfaced shaft, [a second shaft having] a series of *individually mounted, independently rotatable* drive wheels for intermittent peripheral contact with said first shaft, a combined releasing and stopping element for each drive wheel, calculating mechanism having a part operably connected to each drive wheel, and key levers each having cooperable connection with respective elements.

3. A calculating device having a power actuated friction surfaced shaft, [a second shaft having] a series of *individually mounted, independently rotatable* drive wheels for intermittent peripheral contact with said first shaft, a combined releasing and stopping element for each drive wheel, calculating mechanism having a part operably connected to each drive wheel, key levers each having cooperable connection with respective elements, and means for simultaneous locking cooperation with said elements.

4. A calculating device having a power actuated friction surfaced shaft, [a second shaft having] a series of *individually mounted, independently rotatable* drive wheels for intermittent peripheral contact with said first shaft, a combined releasing and stopping element for each drive wheel, calculating mechanism having a part operably connected to each drive wheel, key levers each having cooperable connection with respec-

BEST AVAILABLE COPY tive elements, power cut-off means, and means actuated by said cut-off means for simultaneous locking cooperation with said elements.

5. A calculating device having a power actuated friction surfaced shaft, [a second shaft having] a series of *individually mounted, independently rotatable* drive wheels for intermittent peripheral contact with said first shaft, a trip lever cooperable with each drive wheel, calculating mechanism having a part operably connected to each drive wheel, key levers, and a rod connecting each key lever to a respective trip lever.

6. A calculating device having a power actuated friction surfaced shaft, [a second shaft having] a series of *individually mounted, independently rotatable* drive wheels for intermittent peripheral contact with said first shaft, a trip lever cooperable with each drive wheel, calculating mechanism having a part operably connected to each drive wheel, key levers, a rod connecting each key lever to a respective trip lever, power cut-off means, and means actuated by said cut-off means for simultaneous locking cooperation with said trip levers.

7. A calculating device having a power actuated friction surfaced shaft, [a second shaft having] a series of *individually mounted, independently rotatable* drive wheels for intermittent peripheral contact with said first shaft, a combined releasing and stopping element for each drive wheel, means for initially turning each drive wheel upon the release of its relatable element, calculating mechanism having a part operably connected to each drive wheel, and key levers each having cooperable connection with respective elements.

8. A calculating device having a power actuated friction surfaced shaft, [a second shaft having] a series of *individually mounted, independently rotatable* drive wheels for intermittent peripheral contact with said first shaft, a combined releasing and stopping element for each drive wheel, means for initially turning each drive wheel upon the release of its relatable element, calculating mechanism having a part operably connected to each drive wheel, key levers each having cooperable connection with respective elements, and means for simultaneous locking cooperation with said elements.

9. A calculating device having a power actuated friction surfaced shaft, [a second shaft having] a series of *individually mounted, independently rotatable* drive wheels for intermittent peripheral contact with said first shaft, a combined releasing and stopping element for each drive wheel, means for initially turning each drive wheel upon the release of its relatable element, calculating mechanism having a part operably connected to each drive wheel, key levers each having cooperable connection with respective elements, power cut-off means, and means actuated by said cut-off means for simultaneous locking cooperation with said elements.

10. A calculating device having a power actuated friction surfaced shaft, [a second shaft having] a series of *individually mounted, independently rotatable* drive wheels for intermittent peripheral contact with said first shaft, each drive wheel having a projection thereon, a respective trip lever cooperable with the projection of each drive wheel, calculating mechanism having a part operably connected to each drive wheel, key levers, a rod connecting each key lever to a respective trip lever, power cut-off means, and means actuated by said cut-off means for simultaneous locking cooperation with said trip levers.

11. A calculating device having a power actuated friction surfaced shaft, [a second shaft having] a series of *individually mounted, independently rotatable* drive wheels for intermittent peripheral contact with said first shaft, each drive wheel having a projection thereon, a respective trip lever cooperable with the projection of each drive wheel, resilient means cooperable with each drive wheel, calculating mechanism having a part operably connected to each drive wheel, key levers, a rod connecting each key lever to a respective trip lever, power cut-off means, and means actuated by said cut-off means for simultaneous locking cooperation with said trip levers.

12. In a combined typewriter and calculating machine, the combination of a power actuated computing mechanism, printing instrumentalities, means connecting said printing instrumentalities with said computing mechanism, said computing mechanism having drive wheels, a trip lever for each drive wheel, a key lever connected to each trip lever, means for simultaneous locking cooperation with said trip levers, and power cut-off means cooperable with said locking means.

13. In a combined typewriter and calculating machine, the combination of a power actuated computing mechanism, printing instrumentalities, means connecting said printing instrumentalities with said computing mechanism, said computing mechanism having drive wheels, a trip lever for each drive wheel, a key lever connected to each trip lever, means for initially turning each drive wheel upon the release of its relatable trip lever, means for simultaneous locking cooperation with said trip levers, and power cut-off means cooperable with said locking means.

FERDINAND J. TILLMAN.

REFERENCES CITED

The following references are of record in the file of this patent or the original patent:

UNITED STATES PATENTS

| Number | Name | Date |
|---|---|---|
| 1,054,628 | Vincent | Feb. 25, 1913 |
| 1,136,165 | Perkins | Apr. 20, 1915 |
| 1,237,513 | Hart | Aug. 21, 1917 |
| 1,237,900 | Hart | Aug. 21, 1917 |
| 1,268,565 | Gumprecht | June 4, 1918 |
| 1,358,263 | Tillman | Nov. 9, 1920 |
| 1,644,897 | Schinke | Oct. 11, 1927 |
| 1,973,313 | Hart | Sept. 11, 1934 |
| 2,018,933 | Turck | Oct. 29, 1935 |
| 2,347,720 | Tillman | May 2, 1944 |